United States Patent
Li et al.

(10) Patent No.: US 12,162,790 B2
(45) Date of Patent: Dec. 10, 2024

(54) OVERFLOW BRICK AND SHEET FORMING THICKNESS CONTROL METHOD THEREFOR

(71) Applicant: CAIHONG DISPLAY DEVICES COMPANY LIMITED, Shaanxi (CN)

(72) Inventors: Miao Li, Shaanxi (CN); Menghu Li, Shaanxi (CN); Guohong Yang, Shaanxi (CN); Dacheng Wang, Shaanxi (CN); Zhijun Zhang, Shaanxi (CN)

(73) Assignee: CAIHONG DISPLAY DEVICES COMPANY LIMITED, Shaanxi (CN)

(*) Notice: Subject to any disclaimer, the term of this patent is extended or adjusted under 35 U.S.C. 154(b) by 392 days.

(21) Appl. No.: 17/686,435

(22) Filed: Mar. 4, 2022

(65) Prior Publication Data
US 2022/0267187 A1  Aug. 25, 2022

Related U.S. Application Data
(63) Continuation of application No. PCT/CN2020/117170, filed on Sep. 23, 2020.

(30) Foreign Application Priority Data
Sep. 29, 2019 (CN) .......................... 201910937065.1

(51) Int. Cl.
*C03B 17/06* (2006.01)
(52) U.S. Cl.
CPC .................................. *C03B 17/064* (2013.01)
(58) Field of Classification Search
CPC .................................................... C03B 17/064
See application file for complete search history.

(56) References Cited

U.S. PATENT DOCUMENTS

| | | | |
|---|---|---|---|
| 2010/0269545 A1* | 10/2010 | Boratav | C03B 17/064 65/346 |
| 2010/0293998 A1 | 11/2010 | Burdette et al. | |
| 2012/0103019 A1 | 5/2012 | Milillo et al. | |

FOREIGN PATENT DOCUMENTS

| | | |
|---|---|---|
| CN | 101955315 A | 1/2011 |
| CN | 102557297 A | 7/2012 |

(Continued)

OTHER PUBLICATIONS

Notice of Reasons for Refusal in Japanese Patent Application No. 2022-519984, dated May 9, 2023.

*Primary Examiner* — Cynthia Szewczyk

(57) ABSTRACT

Provided is a sheet forming thickness control method of an overflow brick, including: S1: obtaining a free flow thickness distribution and a free flow speed distribution of an overflow of a glass on an overflow surface of the overflow brick through simulation; S2: calculating an equivalent drawing speed distribution of an overflow guide plate and a critical equivalent drawing speed of the overflow guide plate; S3: calculating an equivalent drawing thickness distribution and a forming thickness distribution of the overflow of the glass; S4: calculating an extreme thickness difference of a formed glass substrate; and S5: when the extreme thickness difference is greater than a preset threshold, changing current parameters and repeating steps S1 to S4; and when the extreme thickness difference is smaller than or equal to the preset threshold, processing the overflow brick and producing the glass substrate in accordance with the current parameters.

6 Claims, 5 Drawing Sheets

(56) References Cited

FOREIGN PATENT DOCUMENTS

| | | |
|---|---|---|
| CN | 105731766 A | 7/2016 |
| CN | 106316079 A | 1/2017 |
| CN | 206127108 U | 4/2017 |
| CN | 108793688 A | 11/2018 |
| CN | 108996894 A | 12/2018 |
| CN | 110963675 A | 4/2020 |
| JP | 2010269997 A | 12/2010 |
| JP | 2019507095 A | 3/2019 |
| WO | 2013102922 A2 | 7/2013 |
| WO | 2014163063 A1 | 10/2014 |

\* cited by examiner

OVERFLOW BRICK AND SHEET FORMING THICKNESS CONTROL METHOD THEREFOR

CROSS-REFERENCE TO RELATED APPLICATIONS

The present application is a continuation of International Application No. PCT/CN2020/117170, filed on Sep. 23, 2020, which claims priority to Chinese Patent Application No. 201910937065.1, filed on Sep. 29, 2019, the entire contents of which are incorporated herein by their references.

TECHNICAL FIELD

The present disclosure relates to the field of manufacture of glass substrates, and relates to an overflow brick and a sheet forming thickness control method for the overflow brick.

BACKGROUND

Glass substrates used in the field of manufacture of flat panel displays such as general thin film transistor liquid crystal displays (TFT-LCDs) and plasma display panels (PDPs) are manufactured by using an overflow downdraw method, and a glass melt that has been melted by a glass melting furnace is supplied to a melt overflow downdraw forming apparatus in a forming process. The manufacture of displays requires larger and larger glass substrates to increase production efficiency and reduce costs, but the larger the glass substrates are, the more difficulties their manufacture faces, the more complicated the quality control of the glass substrates is.

An overflow brick is one of core components of a manufacturing and forming apparatus of the glass substrate. Among them, a control of a thickness uniformity of the glass substrate is one of particularly important process technologies. For example, a thickness fluctuation of a 0.7 mm glass substrate must be within about 20 um or 30 um, and a structural design of the overflow brick and a process margin are one of key factors for stability of the forming process. The forming process, such as flow rate, temperature and the like, is adjusted based on flow rate and balance control of distal and proximal edge plates of the overflow brick and an initial distribution of the overall thickness, so as to avoid instantaneous changes of glass extraction mass distribution and heat distribution, namely, an overflow downdraw method is used for manufacturing the glass substrate which has strict requirements on characteristics of stress, warping, thickness, plate bending and the like and has stable performance. The control for the thickness and thickness uniformity of the glass substrate is one of very important design and process technologies, and because the glass substrate is very thin, any process fluctuation in a production process, including air flow, thermal field and the like, can affect the thickness of the formed glass substrate, and in turn negatively affect a quality of a display, influence of these complex factors on the thickness distribution of the glass substrate needs to be considered in the design of the overflow brick, namely, a production margin is increased in the design, and accordingly, an extreme thickness difference of the whole glass substrate is generally required to be smaller than 15 μm.

How to ensure that a thickness distribution of the glass substrate meets the requirement is one of the important process control and quality management items in the manufacture of the glass substrate, and has become one of the most troublesome problems in the manufacture of the glass substrate.

SUMMARY

The present disclosure provides an overflow brick and a sheet forming thickness control method therefor, aiming to overcome the defect in the related art that the thickness distribution of the produced glass substrate cannot meet use requirements.

To this end, the present disclosure adopts the following technical scheme for implementation.

A sheet forming thickness control method for an overflow brick, including:

S1: equally dividing an overflow surface of the overflow brick into a plurality of parts along a length of the overflow surface, and obtaining, based on structural parameters of the overflow brick and material parameters and flow parameters of a glass, a free flow thickness distribution and a free flow speed distribution of an overflow of the glass on the overflow surface of the overflow brick through simulation;

S2: obtaining an equivalent drawing speed distribution of an overflow guide plate based on a design thickness of a glass substrate and the free flow thickness distribution of the overflow of the glass; and obtaining a critical equivalent drawing speed of the overflow guide plate based on the free flow speed distribution of the overflow of the glass;

S3: equally dividing the overflow guide plate into a plurality of parts along a width of the overflow guide plate, and obtaining an equivalent drawing thickness distribution and a forming thickness distribution of the overflow of the glass based on the free flow speed distribution and the free flow thickness distribution of the overflow of the glass and the equivalent drawing speed distribution and the critical equivalent drawing speed of the overflow guide plate;

S4: obtaining an extreme thickness difference of a formed glass substrate based on the forming thickness distribution of the overflow of the glass; and S5: when the extreme thickness difference of the formed glass substrate is greater than a preset threshold, changing the structural parameters of the overflow brick and the material parameters or the flow parameters of the glass in step S1 and repeating steps S1 to S4; and when the extreme thickness difference of the formed glass substrate is smaller than or equal to the preset threshold, processing the overflow brick and producing the glass substrate in accordance with the structural parameters of the overflow brick and the material parameters and the flow parameters of the glass in step S1.

Further improvements of the present disclosure are listed below.

The step S1 specifically includes:

S101: establishing a geometric model of a fluid part of the overflow brick through three-dimensional software;

S102: establishing a finite element mesh model of the overflow brick through meshing software;

S103: performing simulation by inputting the structural parameters of the overflow brick and the material parameters and the flow parameters of the glass into a fluid software; and S104: equally dividing the overflow surface of the overflow brick into the plurality of parts along the length of the overflow surface, and obtaining the free flow thickness distribution and the free flow speed distribution of the overflow of the glass based on a result of the simulation.

The step S2 specifically includes:

S201: obtaining a distribution of an equivalent drawing speed $V_e$ of the overflow guide plate in accordance with an equation (1) based on the design thickness of the glass substrate and the free flow thickness distribution of the overflow of the glass:

$$V_e = \frac{T \times V_d}{T_s \times 2 \times 1000 \times 60} \tag{1}$$

wherein T represents the design thickness of the glass substrate, in unit of mm; $V_d$ represents a speed of the overflow guide plate, in unit of mm/min; $T_s$ represents a free flow thickness of the overflow of the glass, in unit of mm; and the equivalent drawing speed $V_e$ of the overflow guide plate is in unit of m/s; and S202: obtaining an critical equivalent drawing speed $V_c$ of the overflow guide plate in accordance with an equation (2) based on the free flow speed distribution of the overflow of the glass:

$$V_c = K_c \times V_{smin} \tag{2}$$

wherein $K_c$ represents a critical factor, and $K_c \approx 1$; $V_{smin}$ represents a minimum free flow speed, in unit of m/s; and $V_c$ is in unit of m/s.

In the step S201, the speed $V_d$ of the overflow guide plate is obtained in accordance with an equation (3):

$$V_d = \frac{Q \times 1000 \times 1000 \times 1000}{60 \times \rho \times \left(\frac{L + W_Y}{2}\right) \times T} \tag{3}$$

where Q represents an output amount of the overflow brick, in unit of Kg/Hr; $\rho$ represents a density of the glass, in unit of Kg/m³; L represents the length of the overflow surface of the overflow brick, in unit of mm; $W_Y$ represents the width of the overflow guide plate, in unit of mm; T represents the design thickness of the glass substrate, in unit of mm; and the speed $V_d$ of the overflow guide plate is in unit of mm/min.

The step S3 specifically includes:

S301: obtaining a shrinkage factor of the glass substrate in accordance with an equation (4):

$$C_s = \frac{W_Y}{L} \tag{4}$$

where $W_Y$ represents the width of the overflow guide plate, in unit of mm; and L represents the length of the overflow surface of the overflow brick, in unit of mm; and S302: obtaining an equivalent drawing thickness $T_e$ of the overflow of the glass through an equation (5):

$$T_e = \frac{V_C + V_S \times C_S}{V_e / C_S + V_S \times C_S} \times \frac{T_S}{C_S} \tag{5}$$

where $V_c$ represents the critical equivalent drawing speed of the overflow guide plate, in unit of m/s; $V_S$ represents a free flow speed of the overflow of the glass, in unit of m/s; $V_e$ represents the equivalent drawing speed distribution of the overflow guide plate, in unit of m/s; $T_S$ represents a free flow thickness of the overflow of the glass, in unit of mm; and an equivalent drawing thickness $T_e$ of the overflow of the glass is in unit of mm;

S303: obtaining an equivalent glass flow rate $Q_e$ at different positions of the overflow surface of the overflow brick in accordance with an equation (6):

$$Q_e = \frac{T_e \times Q}{2600 \times \overline{T_e}} \tag{6}$$

where $\overline{T_e}$ represents an average equivalent drawing thickness on the overflow surface of the overflow brick, in unit of mm; and Q represents an output amount of the overflow brick, in unit of Kg/Hr;

S304: obtaining a forming thickness of the overflow of the glass in accordance with equation (7):

$$T_f = \frac{Q_e \times 1000}{\rho \times \frac{W_Y}{N \times 1000} \times \frac{V_d}{60 \times 1000}} \tag{7}$$

where $\rho$ represents a density of the glass, in unit of Kg/m³; and $V_d$ represents a speed of the overflow guide plate, in unit of mm/min; and S305: equally dividing the overflow guide plate into a plurality of parts along the width of the overflow guide plate, and obtaining an equivalent drawing thickness and a forming thickness distribution of the overflow of the glass in accordance with steps S301 to S304.

The step S4 specifically includes obtaining the extreme thickness difference Δ of the formed glass substrate in accordance with an equation (8) based on the forming thickness distribution of the overflow of the glass:

$$\Delta = \text{MAX}(T_{f0}, \ldots, T_{fN}) - \text{MIN}(T_{f0}, \ldots, T_{fN}) \tag{8}$$

where $T_{f0}, \ldots, T_{fN}$ represents the forming thickness distribution of the overflow of the glass.

Compared with the related art, the present disclosure has the following beneficial effects.

According to the method of the present disclosure, a free flow thickness distribution and a free flow speed distribution of an overflow of the glass on a series of overflow surfaces of an overflow brick are obtained through analog simulation; then an equivalent drawing speed distribution of an overflow guide plate and a critical equivalent drawing speed of the overflow guide plate related to the guide plate or the drawing speed are calculated, and an equivalent drawing thickness distribution and a forming thickness distribution of a series of overflows of the glass are calculated; finally, an extreme thickness difference of a formed glass substrate is calculated, and whether the forming thickness distribution and extreme thickness difference meet design objectives is evaluated. When the design objectives are not met, an output amount of the overflow brick, a forming viscosity of the glass and the structural parameters of the overflow brick, e.g., a groove inlet width, a groove inlet height, an inclination angle of an overflow weir, a length of an overflow surface, a bottom curve of an overflow groove, etc., or a combination thereof are adjusted preferentially, until the forming effects, i.e., the thickness distribution and extreme thickness difference meet the design objectives, and the overflow brick is processed and the glass substrate is produced. According to the method of the present disclosure, a problem of fluctuation of the forming thickness of the glass substrate is effectively solved, and a production margin is increased in design, so that the thickness of the formed glass substrate can meet the requirement, a complex requirement on process adjustment is further reduced, and a further stability of a production line is maintained.

Figure 1:
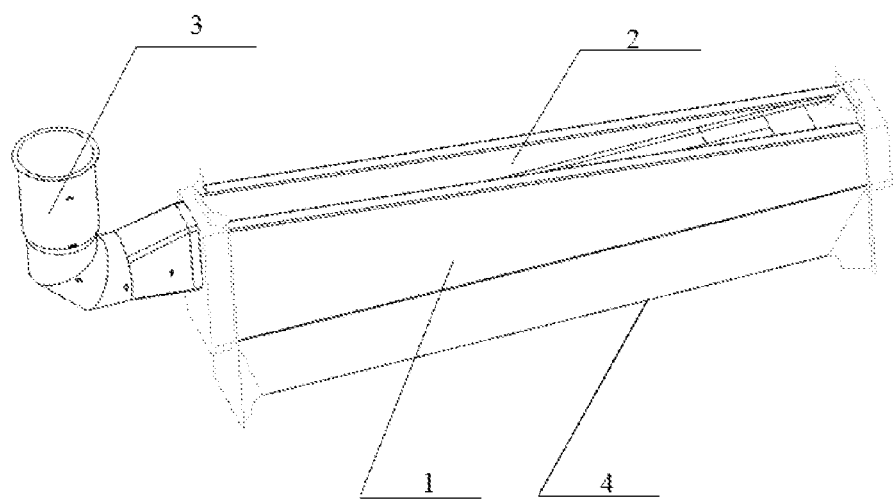
FIG. 1 is a structural schematic diagram of an overflow system.

1—overflow brick; 2—overflow groove; 3—glass melt feeding apparatus; 4—root of an overflow brick; 5—formed glass substrate; 6—down-drawing direction of glass substrate.

DESCRIPTION OF EMBODIMENTS

In order to enable those skilled in the art to understand the technical solutions of the present disclosure, technical solutions in the embodiments of the present disclosure will be described below clearly and completely in conjunction with the accompanying drawings in the embodiments. Apparently, the embodiments described here are only part of the embodiments of the present disclosure and are not all embodiments of the present disclosure. Based on the embodiments of the present disclosure, other embodiments obtained by those skilled in the art without creative labor shall fall within the protection scope of the present disclosure.

It should be noted that the terms "first," "second," and the like in the description and claims of the present disclosure and in the drawings described above are used for distinguishing similar objects from one another and not necessarily for describing a particular sequential or chronological order. It is to be understood that the data so used is interchangeable under appropriate circumstances such that the embodiments of the present disclosure described herein can be implemented in other sequences than those illustrated or described herein. In addition, the terms "include/comprise" and "have" and any variations thereof are intended to cover a non-exclusive inclusion, such that a process, method, system, article, or device that comprises a list of steps or elements is not necessarily limited to those steps or elements expressly listed, but may further include other steps or elements not expressly listed or inherent to such process, method, article, or device.

The present disclosure is described in further detail below in conjunction with the accompanying drawings.

Figure 2:
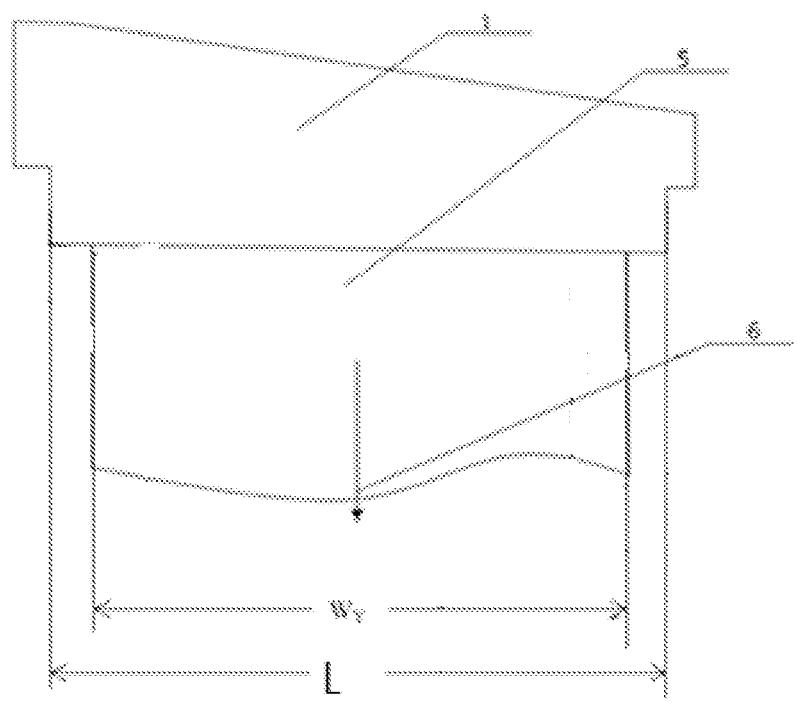
FIG. 2 is a structural schematic diagram illustrating an overflow downdraw.
Figure 3:
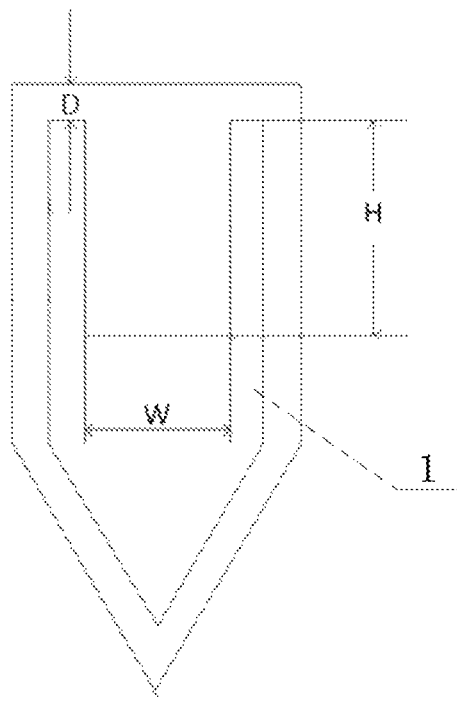
FIG. 3 is a structural schematic diagram illustrating an external appearance of an overflow brick.
Figure 4:
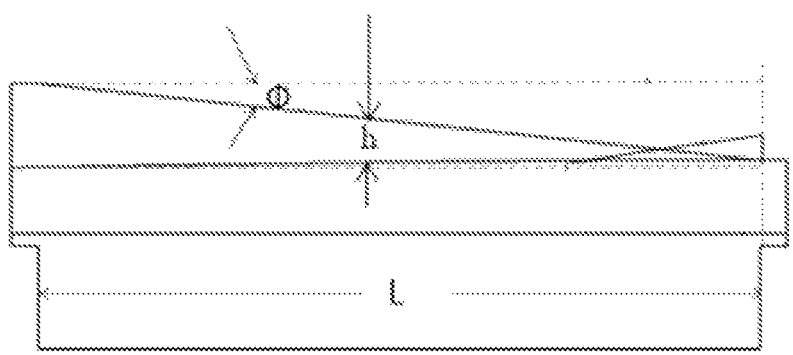
FIG. 4 is a structural schematic diagram of an overflow groove in an overflow brick.

As illustrated in FIG. 1, an overflow system is formed by connecting an overflow brick 1 and a glass melt feeding apparatus 3. An overflow groove 2 is defined in the overflow brick 1, and the bottom of the overflow brick 1 is the root of the overflow brick 1; when a glass substrate is produced by a melt overflow method, in a forming process, a glass melt that has been melted in a glass melting furnace is supplied to the glass melt feeding apparatus 3 in a melt overflow forming apparatus, and overflows along the overflow groove 2 from two sides of the overflow brick 1, thereby forming a glass substrate below a root 4 of the overflow brick 1. Referring to FIG. 2, FIG. 2 is a structural schematic diagram illustrating an overflow downdraw, in which a guide plate is used as a forming base of a glass substrate, and a formed glass substrate 5 moves downwards along a down-drawing direction 6 of the glass substrate in a downdraw forming process of the glass substrate. In the downdraw forming process of the glass substrate, the molten glass liquid gradually forms a glass substrate along the glass guide plate; in the width direction, from a center of the glass substrate to two ends of the glass substrate, the thickness of the glass substrate is small and uniform in the middle, and the thickness of the glass substrate formed gradually increase from the middle to the two ends. Referring to FIGS. 3 and 4, FIG. 3 is a structural schematic diagram illustrating an external appearance of an overflow brick used for manufacturing a glass substrate by an overflow downdraw process, and FIG. 4 is a structural schematic diagram of an overflow groove in an overflow brick. Key structural design dimensions are given in the figures, including a groove inlet width W, a groove inlet height H, an inclination angle $\emptyset_0$ of an overflow weir, and a length L of an overflow surface of the overflow brick, and in actual production, the overflow brick includes the above parameters, and of course, also includes an overflow groove bottom curve.

Figure 5:
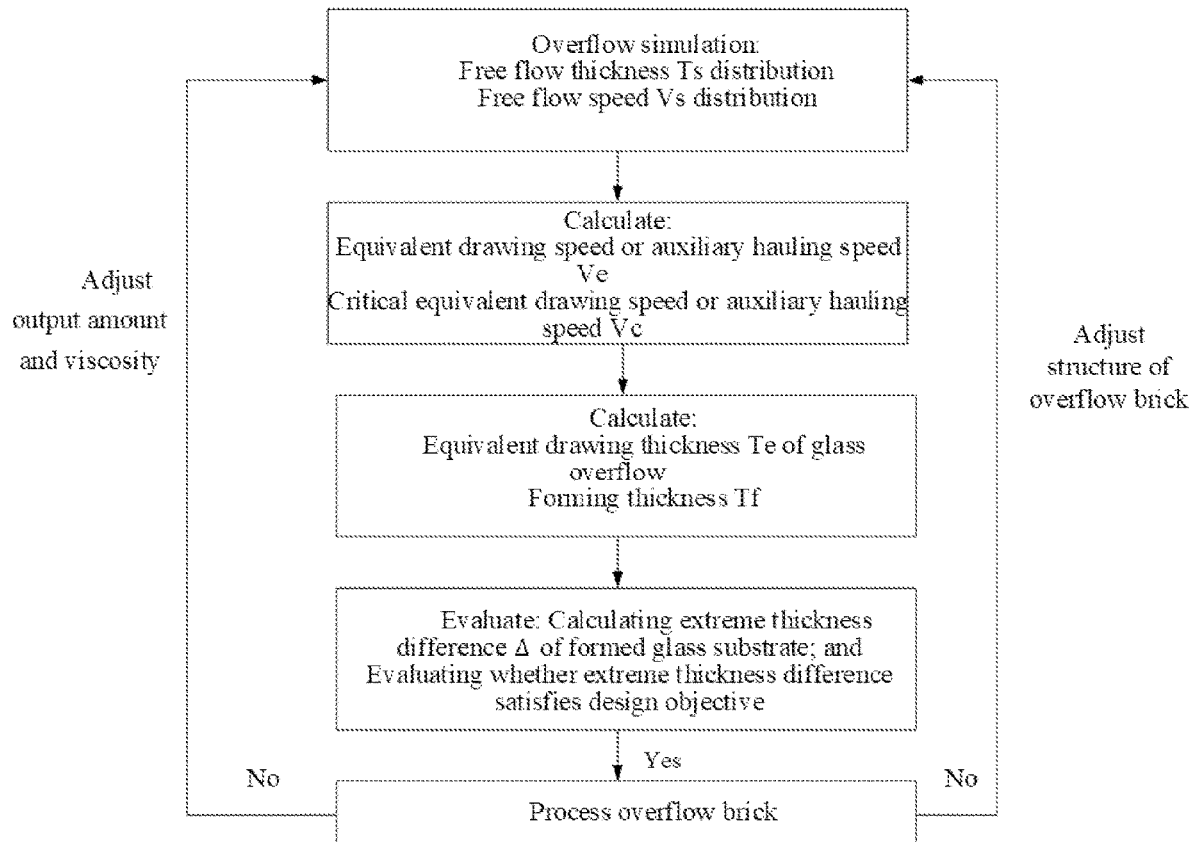
FIG. 5 is a flow block diagram of a sheet forming thickness control method of an overflow brick according to the present disclosure.

Referring to FIG. 5, a sheet forming thickness control method of the overflow brick of the present disclosure includes the following steps.

In step S1, a free flow thickness $T_s$ distribution and a free flow speed $V_s$ distribution of an overflow of a glass on an overflow surface of an overflow brick are obtained through simulation by using professional fluid software such as FLUENT.

Specifically, the step S1 includes the following steps.

In step S101, a geometric model of a fluid part of the overflow brick is established through CAD software or PROE or the like.

In step S102, a finite element mesh model of the overflow brick is established through meshing software without software limitation.

In step S103, simulation is performed using professional fluid software such as FLUENT by inputting relevant conditions, such as material parameters of the glass, such as density, viscosity, surface tension and the like, and flow parameters of the glass.

In step S104, a length L of the overflow surface of the overflow brick is equally divided into N equal parts, such as 50 equal parts, and the free flow thickness $T_s$ distribution and the free flow speed $V_s$ distribution of a series of overflows of the glass are obtained based on a result of the simulation, which are illustrated in Table 1.

TABLE 1

Table of free flow thickness distribution and free
flow speed distribution of overflow of glass

| Z coordinate of position | 0.00000 | L × 1/N | ... | L × n/N | ... | L |
|---|---|---|---|---|---|---|
| $T_s$ | $T_{s0}$ | $T_{s1}$ | ... | $T_{sn}$ | ... | $T_{sN}$ |
| $V_s$ | $V_{s0}$ | $V_{s1}$ | ... | $V_{sn}$ | ... | $V_{sN}$ |

The free flow thickness $T_s$ distribution of the overflow of the glass is the result obtained based on different simulation conditions, e.g., based on different output amounts of the overflow brick or based on different viscosities of the glass materials, and comparison can be performed between the effects obtained based on different conditions.

In step S2, an equivalent drawing speed or auxiliary hauling speed $V_e$ and a critical equivalent drawing speed or auxiliary hauling speed $V_C$ related to a guide plate or a hauling speed are calculated. Specifically, the step S2 includes the following steps.

In step S201, an equivalent drawing speed $V_e$ distribution of an overflow guide plate related to the guide plate or the hauling speed is calculated in accordance with an equation (1):

$$V_e = \frac{T \times V_d}{T_s \times 2 \times 1000 \times 60}, \quad (1)$$

where T represents a design thickness of the glass substrate, in unit of mm; $V_d$ represents a speed of the overflow guide plate, in unit of mm/min; $T_s$ represents a free flow thickness of the overflow of the glass, in unit of mm; and $V_e$ is in unit of m/s.

The speed $V_d$ of the overflow guide plate is calculated in accordance with an equation (2):

$$V_d = \frac{Q \times 1000 \times 1000 \times 1000}{60 \times \rho \times \left(\frac{L + W_Y}{2}\right) \times T}, \quad (2)$$

where Q represents an output amount of the overflow brick, in unit of Kg/Hr; $\rho$ represents a density of the glass, in unit of Kg/m³; L represents the length of the overflow surface of the overflow brick, in unit of mm; $W_Y$ represents the width of the overflow guide plate, in unit of mm; and $V_d$ is in unit of mm/min.

In step S202, a critical equivalent drawing speed $V_c$ of the overflow guide plate related to the guide plate or the hauling speed is calculated in accordance with an equation (3):

$$V_c = K_c \times V_{smin} \quad (3),$$

where $K_c$ represents a critical factor, and $K_c \approx 1$; $V_{smin}$ represents a minimum free flow speed of the overflow of the glass, in unit of m/s; and $V_c$ is in unit of m/s.

In step S3, an equivalent drawing thickness $T_e$ and a forming thickness $T_f$ of the overflow of the glass are calculated. Specifically, the step S3 includes the following steps.

In step S301, a shrinkage factor of the glass substrate is calculated in accordance with an equation (4):

$$C_s = \frac{W_Y}{L}, \quad (4)$$

where $W_Y$ represents a width of the overflow guide plate, in unit of mm; and L represents the length of the overflow surface of the overflow brick, in unit of mm.

In step S302, the equivalent drawing thickness $T_e$ of the overflow of the glass is calculated through an equation (5):

$$T_e = \frac{V_C + V_S \times C_S}{V_e/C_S + V_S \times C_S} \times \frac{T_S}{C_S}, \quad (5)$$

where $V_c$ represents the critical equivalent drawing speed or auxiliary hauling speed, in unit of m/s; $V_S$ represents a free flow speed of the overflow of the glass, in unit of m/s; $V_e$ represents the equivalent drawing speed or auxiliary hauling speed, in unit of m/s; $T_S$ represents a free flow thickness of the overflow of the glass, in unit of mm; $C_S$ represents the shrinkage factor of the glass substrate, and $T_e$ is in unit of mm.

In step S303, an equivalent glass flow rate $Q_e$ at different positions of the overflow surface of the overflow brick is calculated in accordance with an equation (6):

$$Q_e = \frac{T_e \times Q}{2600 \times \overline{T_e}}, \quad (6)$$

where $T_e$ represents an equivalent drawing thickness of the overflow of the glass, in unit of mm; $\overline{T_e}$ represents an average equivalent drawing thickness on the overflow surface of the overflow brick, in unit of mm; and Q represents an output amount, in unit of Kg/Hr.

In step S304, a forming thickness $T_f$ of the overflow of the glass is calculated in accordance with equation (7):

$$T_f = \frac{Q_e \times 1000}{\rho \times \frac{W_Y}{N \times 1000} \times \frac{V_d}{60 \times 1000}}, \quad (7)$$

where $Q_e$ represents an equivalent glass flow rate at different positions of the overflow surface of the overflow brick, in unit of Kg/Hr; $\rho$ represents a density of the glass, in unit of Kg/m³; $W_Y$ represents the width of the overflow guide plate, in unit of mm; and $V_d$ represents a speed of the overflow guide plate, in unit of mm/min.

In step S305, the width $W_Y$ of the overflow guide plate is equally divided into N equal parts, such as 50 equal parts, and the equivalent drawing thickness $T_e$ distribution and the forming thickness $T_f$ distribution of a series of overflows of the glass are obtained based on the calculation results above, which can be seen in Table 2.

TABLE 2

Table of equivalent drawing thickness distribution and
forming thickness distribution of overflow of glass

| Z coordinate of position | 0.00000 | $W_Y$ × 1/N | ... | $W_Y$ × n/N | ... | $W_Y$ |
|---|---|---|---|---|---|---|
| $T_e$ | $T_{e0}$ | $T_{e1}$ | ... | $T_{en}$ | ... | $T_{eN}$ |
| $T_f$ | $T_{f0}$ | $T_{f1}$ | ... | $T_{fn}$ | ... | $T_{fN}$ |

In step S4, an extreme thickness difference Δ of the formed glass substrate is calculated in accordance with an equation (8):

$$\Delta = \mathrm{MAX}(T_{f0}, \ldots, T_{fN}) - \mathrm{MIN}(T_{f0}, \ldots, T_{fN}) \quad (8).$$

In step S5: whether forming effects, i.e., the thickness distribution and extreme thickness difference of the formed glass substrate meet design objectives is evaluated.

Specifically, the step S5 includes: when the design objectives are met, performing overflow brick processing and glass substrate production based on the structural parameters of the overflow brick, the material parameters of the glass or the flow parameters of the glass in step S1.

The step S5 further includes: when the design objectives are not met, adjusting the output amount Q of the overflow brick or preferentially adjusting the glass viscosity of the overflow brick or optimizing the structural parameters of the overflow brick, where the structural parameters include a groove inlet width W, a groove inlet height H, inclination angle $\varnothing_0$ of an overflow weir, a length L of an overflow surface, a bottom curve of an overflow groove, etc., or a combination thereof of the overflow brick; and then returning to the step S1.

Figure 6:
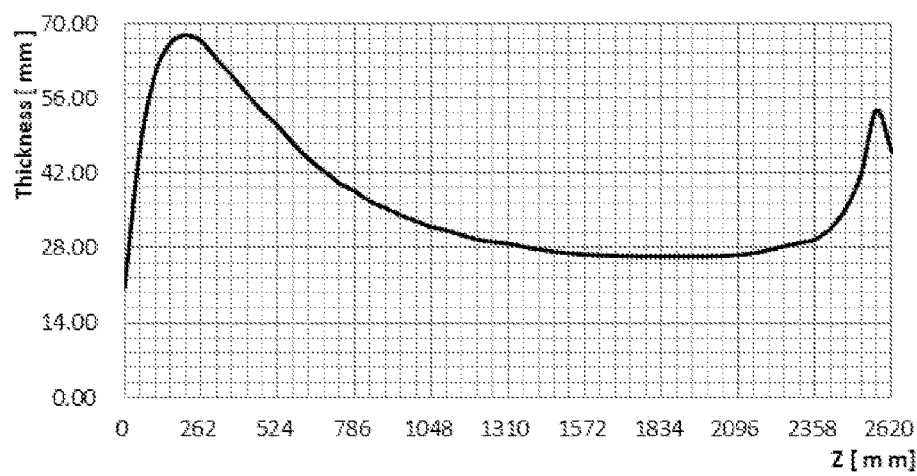
FIG. 6 is a graph illustrating a result of a free flow thickness distribution according to an embodiment of the present disclosure.
Figure 7:
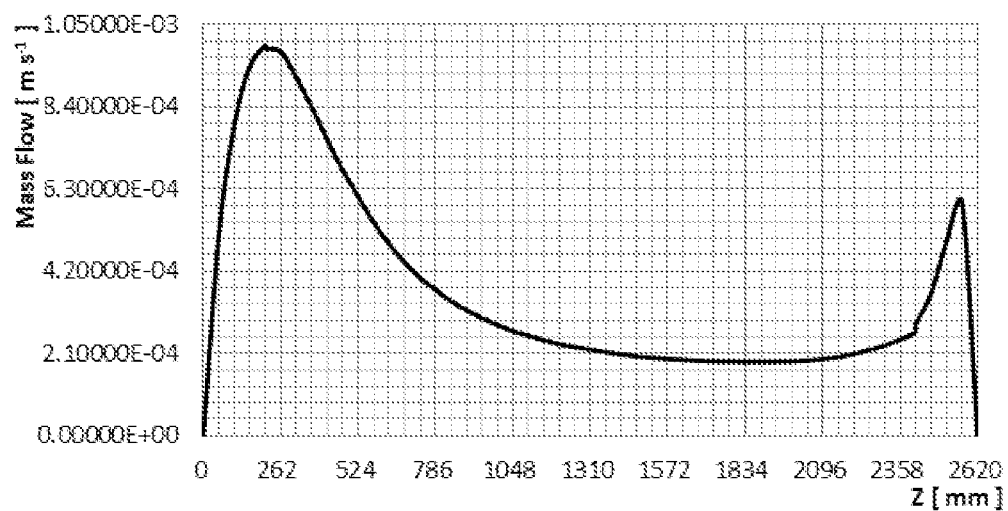
FIG. 7 is a graph illustrating a result of a free flow speed distribution according to an embodiment of the present disclosure.
Figure 8:
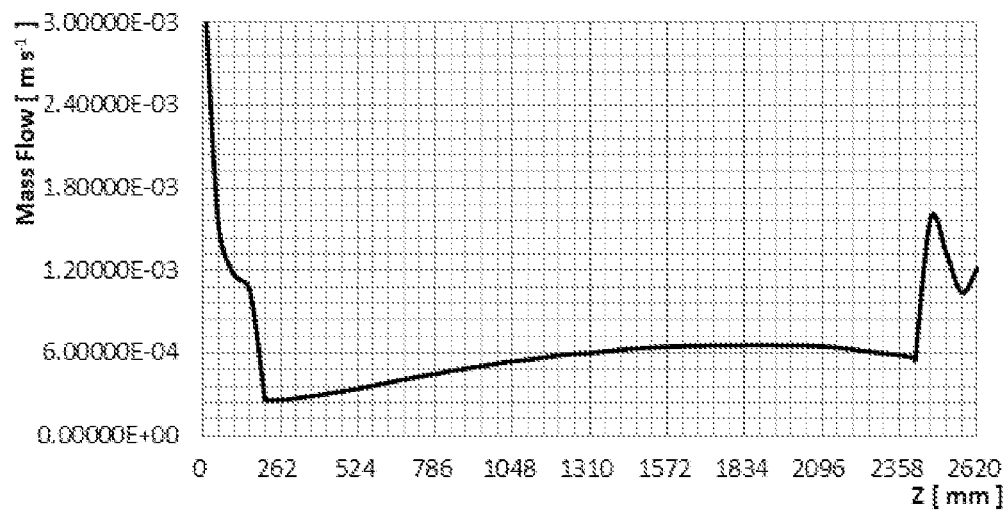
FIG. 8 is a graph illustrating a result of an equivalent drawing speed distribution according to an embodiment of the present disclosure.
Figure 9:
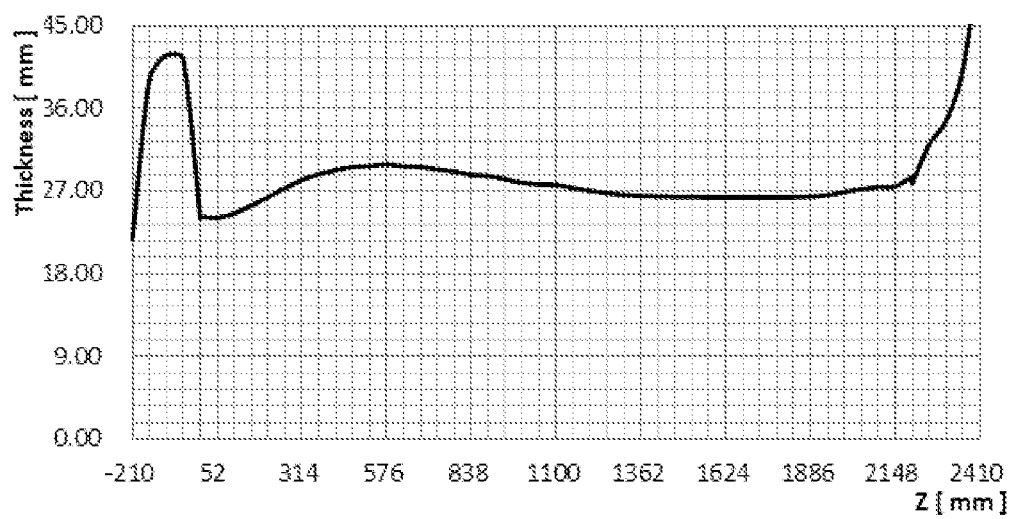
FIG. 9 is a graph illustrating a result of an equivalent drawing thickness distribution according to an embodiment of the present disclosure.
Figure 10:
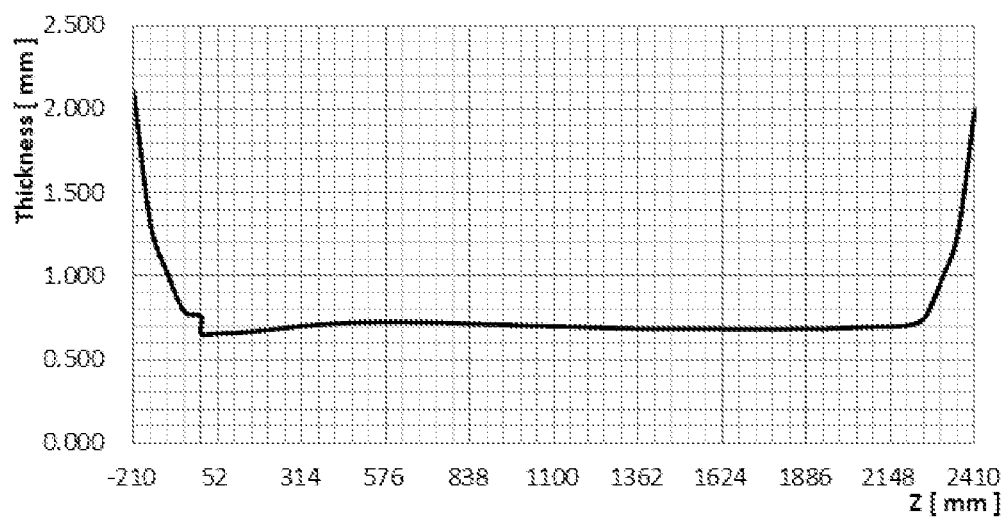
FIG. 10 is a graph illustrating a result of a forming thickness distribution according to an embodiment of the present disclosure.

FIG. 6 to FIG. 10 illustrate an embodiment of the sheet forming thickness control method of an overflow brick provided by the present disclosure. After the overflow brick is optimized, the groove inlet height H of the overflow brick is 259.254 mm, the groove inlet width W is 200.032 mm, the length L of the overflow surface is 2973 mm, the inclination angle $\varnothing_0$ of the overflow weir is 6.0°, and the output amount Q is 20 tons/day; a target of the extreme thickness difference is smaller than 70 μm. FIG. 6 is a schematic diagram illustrating a free flow thickness distribution according of this embodiment; FIG. 7 is a schematic diagram illustrating a free flow speed distribution of this embodiment; FIG. 8 is a schematic diagram illustrating an equivalent drawing speed distribution of this embodiment; FIG. 9 is a schematic diagram illustrating an equivalent drawing thickness distribution of this embodiment of the present disclosure; FIG. 10 is a schematic diagram illustrating an forming thickness distribution of an embodiment; and the extreme thickness difference of this embodiment is 68.52 μm, fully satisfying the design objective.

The above contents are only for illustrating the technical idea of the present disclosure, and the protection scope of the present disclosure is limited thereto. Any modification made on the basis of the technical idea proposed by the present disclosure falls within the protection scope of the claims of the present disclosure.

What is claimed is:

1. A sheet forming thickness control method of an overflow brick, comprising:
   S1: equally dividing an overflow surface of the overflow brick into a plurality of parts along a length of the overflow surface, and obtaining, based on structural parameters of the overflow brick and material parameters and flow parameters of a glass, a free flow thickness distribution and a free flow speed distribution of an overflow of the glass on the overflow surface of the overflow brick through simulation;
   S2: obtaining an equivalent drawing speed distribution of an overflow guide plate based on a design thickness of a glass substrate and the free flow thickness distribution of the overflow of the glass; and obtaining a critical equivalent drawing speed of the overflow guide plate based on the free flow speed distribution of the overflow of the glass;
   S3: equally dividing the overflow guide plate into a plurality of parts along a width of the overflow guide plate, and obtaining an equivalent drawing thickness distribution and a forming thickness distribution of the overflow of the glass based on the free flow speed distribution and the free flow thickness distribution of the overflow of the glass and the equivalent drawing speed distribution and the critical equivalent drawing speed of the overflow guide plate;
   S4: obtaining an extreme thickness difference of a formed glass substrate based on the forming thickness distribution of the overflow of the glass; and
   S5: when the extreme thickness difference of the formed glass substrate is greater than a preset threshold, changing the structural parameters of the overflow brick and the material parameters or the flow parameters of the glass in step S1, and repeating steps S1 to S4; and when the extreme thickness difference of the formed glass substrate is smaller than or equal to the preset threshold, processing the overflow brick and producing the glass substrate in accordance with the structural parameters of the overflow brick and the material parameters and the flow parameters of the glass in step S1.

2. The sheet forming thickness control method of the overflow brick according to claim 1, wherein the step S1 comprises:
   S101: establishing a geometric model of a fluid part of the overflow brick through three-dimensional software;
   S102: establishing a finite element mesh model of the overflow brick through meshing software;
   S103: performing the simulation by inputting the structural parameters of the overflow brick and the material parameters and the flow parameters of the glass into a fluid software; and
   S104: equally dividing the overflow surface of the overflow brick into the plurality of parts along the length of the overflow surface, and obtaining the free flow thickness distribution and the free flow speed distribution of the overflow of the glass based on a result of the simulation.

3. The sheet forming thickness control method of the overflow brick according to claim 1, wherein the step S2 comprises:
   S201: obtaining a distribution of an equivalent drawing speed $V_e$ of the overflow guide plate in accordance with an equation (1) based on the design thickness of the glass substrate and the free flow thickness distribution of the overflow of the glass:

$$V_e = \frac{T \times V_d}{T_s \times 2 \times 1000 \times 60}, \quad (1)$$

wherein T represents the design thickness of the glass substrate, in unit of mm; $V_d$ represents a speed of the overflow guide plate, in unit of mm/min; $T_s$ represents a free flow thickness of the overflow of the glass, in unit of mm; and the equivalent drawing speed $V_e$ of the overflow guide plate is in unit of m/s; and
   S202: obtaining a critical equivalent drawing speed $V_c$ of the overflow guide plate in accordance with an equation (2) based on the free flow speed distribution of the overflow of the glass:

$$V_c = K_c \times V_{smin} \quad (2),$$

wherein $K_c$ represents a critical factor, and $K_c \approx 1$; $V_{smin}$ represents a minimum free flow speed, in unit of m/s; and $V_c$ is in unit of m/s.

4. The sheet forming thickness control method of the overflow brick according to claim 3, wherein the speed $V_d$ of the overflow guide plate is obtained in accordance with an equation (3):

$$V_d = \frac{Q \times 1000 \times 1000 \times 1000}{60 \times \rho \times \left(\frac{L+W_Y}{2}\right) \times T}, \quad (3)$$

wherein Q represents an output amount of the overflow brick, in unit of Kg/Hr; $\rho$ represents a density of the glass, in unit of Kg/m³; L represents the length of the overflow surface of the overflow brick, in unit of mm; $W_Y$ represents the width of the overflow guide plate, in unit of mm; T represents the design thickness of the glass substrate, in unit of mm; and the speed $V_d$ of the overflow guide plate is in unit of mm/min.

5. The sheet forming thickness control method of the overflow brick according to claim 1, wherein the step S3 comprises:
S301: obtaining a shrinkage factor of the glass substrate in accordance with an equation (4):

$$C_s = \frac{W_Y}{L}, \quad (4)$$

wherein $W_Y$ represents the width of the overflow guide plate, in unit of mm; and L represents the length of the overflow surface of the overflow brick, in unit of mm;
S302: obtaining an equivalent drawing thickness $T_e$ of the overflow of the glass through an equation (5):

$$T_e = \frac{V_C + V_S \times C_S}{V_e/C_S + V_S \times C_S} \times \frac{T_S}{C_S}, \quad (5)$$

wherein $V_c$ represents the critical equivalent drawing speed of the overflow guide plate, in unit of m/s; $V_S$ represents a free flow speed of the overflow of the glass, in unit of m/s; $V_e$ represents the equivalent drawing speed distribution of the overflow guide plate, in unit of m/s; $T_S$ represents a free flow thickness of the overflow of the glass, in unit of mm; and an equivalent drawing thickness $T_e$ of the overflow of the glass is in unit of mm;
S303: obtaining an equivalent glass flow rate $Q_e$ at different positions of the overflow surface of the overflow brick in accordance with an equation (6):

$$Q_e = \frac{T_e \times Q}{2600 \times \overline{T_e}}, \quad (6)$$

wherein $\overline{T_e}$ represents an average equivalent drawing thickness on the overflow surface of the overflow brick, in unit of mm, and Q represents an output amount of the overflow brick, in unit of Kg/Hr;
S304: obtaining a forming thickness $T_f$ of the overflow of the glass in accordance with equation (7):

$$T_f = \frac{Q_e \times 1000}{\rho \times \frac{W_Y}{N \times 1000} \times \frac{V_d}{60 \times 1000}}, \quad (7)$$

wherein $\rho$ represents a density of the glass, in unit of Kg/m³; and $V_d$ represents a speed of the overflow guide plate, in unit of mm/min; and
S305: equally dividing the overflow guide plate into a plurality of parts along the width of the overflow guide plate, and obtaining an equivalent drawing thickness and a forming thickness distribution of the overflow of the glass in accordance with steps S301 to S304.

6. The sheet forming thickness control method of the overflow brick according to claim 5, wherein the step S4 comprises:
obtaining the extreme thickness difference $\Delta$ of the formed glass substrate in accordance with an equation (8) based on the forming thickness distribution of the overflow of the glass:

$$\Delta = \text{MAX}(T_{f0}, \ldots, T_{fN}) - \text{MIN}(T_{f0}, \ldots, T_{fN}) \quad (8)$$

wherein $T_{f0}, \ldots, T_{fN}$ represents the forming thickness distribution of the overflow of the glass.

* * * * *